UNITED STATES PATENT OFFICE.

EUGEN BORNER, OF OFFENBURG, GERMANY.

PROCESS FOR THE PRODUCTION OF FRESCO-PAINTINGS AND COLORED WEATHER-PROOF ARCHITECTURAL ORNAMENTS.

1,116,979.     Specification of Letters Patent.     Patented Nov. 10, 1914.

No Drawing.     Application filed November 23, 1911. Serial No. 662,043.

*To all whom it may concern:*

Be it known that I, EUGEN BORNER, a subject of the German Emperor, residing at Offenburg, Baden, in the German Empire, have invented a new and useful Process for the Production of Fresco-Paintings and Colored Weatherproof Architectural Ornaments; and I do hereby declare that the following is a full, clear, and exact description of the invention, which will enable others skilled in the art to which it appertains to make and use the same.

This invention relates to the production of fresco-paintings and colored weatherproof architectural ornaments, that is plates or placques for ornamental purposes in buildings.

The mass for the production of the articles consists of an earthen alkaline base with water-glass, mixed with grains of powder of a substance vitrifying when heated. The articles molded from this mass are painted with smelting-colors, ceramic colors or glass-colors. Then the articles are burned in a kiln at medium temperature, so that the colors begin to smelt and the body portion is closely bound, and so to speak vitrified. During the burning a chemical action takes place between the ceramic colors and the surface of the body mass, the colors or glazings partially sink in and combine with the constituents of the body mass, but are not absorbed further inward, but remain upon the exterior surface thereof. The burning temperature may be 800–1000° C. In this method of working, plates, stones and architectural ornaments of all colors can be prepared.

As an earthen alkaline base, burnt lime or caustically burnt magnesia are used. These materials are mixed with water-glass (silicate of sodium or potassium) to a paste, to which feldspar, granite, porphyry, basalt or glass in a granular or pulverulent condition are added. Only such natural or artificial additions are used which will bring about the vitrification of the whole mass when fired. To increase the stiffness of the mass, sand and quartz, for instance ordinary pit-sand, may be added.

Attention is directed to the fact, that the articles are finished by burning. Indeed, lime and magnesia harden already with water-glass, but this hardening is insufficient. The necessary strength and weatherproof quality can only be attained if the vitrifying materials (fluxes) are used to bind the mass when firing. Without the addition of fluxes the strength produced by burning the articles would also not be sufficient. Therefore the vitrification has nothing to do with the masses containing water-glass, wherein lime and water-glass only react while cold.

The mass is very plastic, easily formed and imparts an enamel like gloss to the smelting paints.

What I claim and desire to secure by Letters Patent is:—

1. The process of manufacturing plates or plaques for ornamental purposes in buildings consisting in forming a plastic composition of an earthen alkaline base with filling material capable of vitrifying when heated, water-glass and flux like additions, then forming the mass into a desired shape, painting with smelting colors upon the said mass and then burning the whole.

2. The process of manufacturing plates or plaques for ornamental purposes in buildings consisting in forming a plastic composition of lime with finely divided material capable of vitrifying when heated, water-glass and flux like additions, then forming the mass into a desired shape, painting with smelting colors upon the said mass and then burning the whole.

3. The process of manufacturing plates or plaques for ornamental purposes in buildings consisting in forming a plastic composition of lime with water-glass and feldspar and sand, then forming the mass into a desired shape, painting with smelting colors upon the said mass and then burning the whole.

4. The process of manufacturing plates or plaques for ornamental purposes in buildings consisting in forming a plastic composition of lime with water-glass and feldspar and sand, then forming the mass into a desired shape, painting with ceramic and glass-colors upon the said mass and then burning the whole.

5. The process of manufacturing plates or plaques for ornamental purposes in buildings consisting in forming a plastic composition of lime with water-glass and porphyry and sand, then forming the mass into a desired shape, painting with ceramic and glass-colors upon the said mass and then burning the whole.

6. The process of manufacturing plates or plaques for ornamental purposes in buildings consisting in forming a plastic composition of lime with water-glass and granite and sand, then forming the mass into a desired shape, painting with ceramic and glass-colors upon the said mass and then burning the whole.

EUGEN BORNER.

Witnesses:
ADOLP FATZAH,
FRIMRITZ GOETZ.